W. W. BROWN.
LID HOLDER FOR COOKING UTENSILS AND RECEPTACLES.
APPLICATION FILED MAR. 25, 1921.
1,395,554.
Patented Nov. 1, 1921.
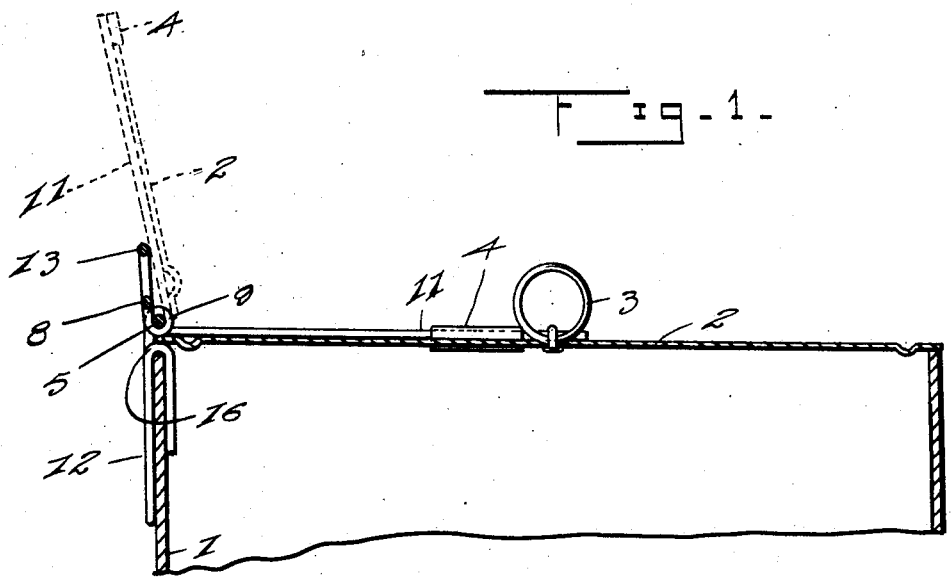
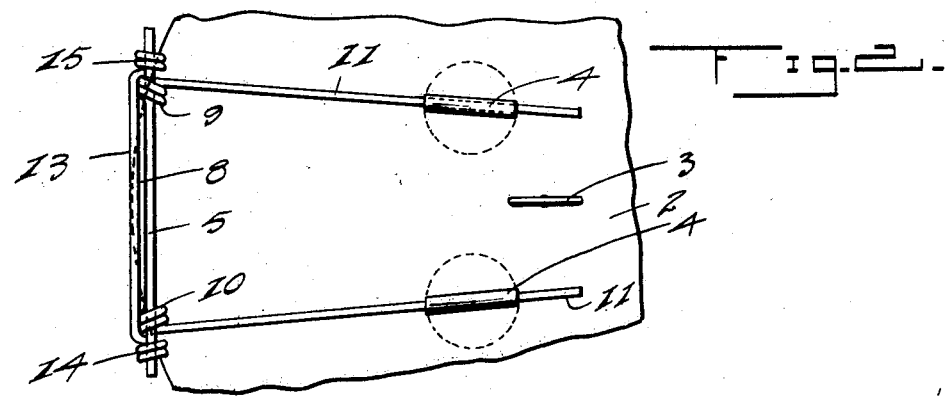
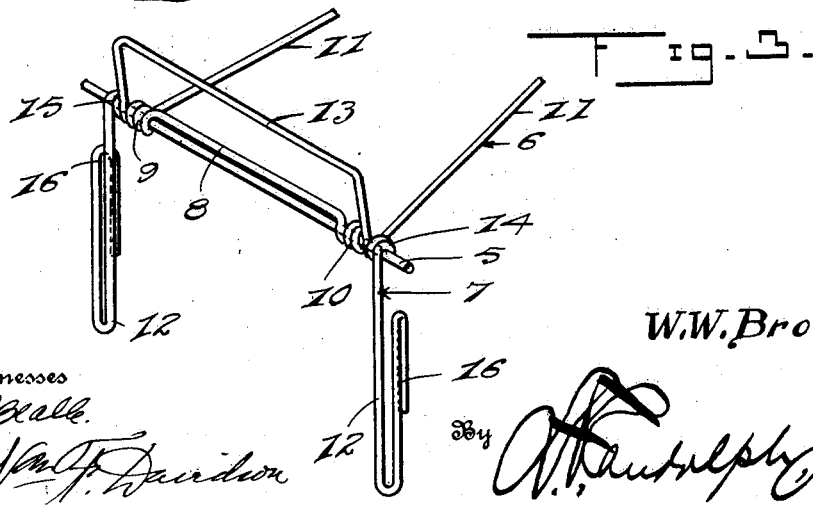
Inventor
W. W. Brown
Witnesses
By
Attorney

UNITED STATES PATENT OFFICE.

WILLIAM W. BROWN, OF MEDFORD, OREGON.

LID-HOLDER FOR COOKING UTENSILS AND RECEPTACLES.

1,395,554.  Specification of Letters Patent.  Patented Nov. 1, 1921.

Application filed March 25, 1921. Serial No. 455,599.

*To all whom it may concern:*

Be it known that I, WILLIAM W. BROWN, a citizen of the United States, residing at Medford, in the county of Jackson and State of Oregon, have invented certain new and useful Improvements in Lid-Holders for Cooking Utensils and Receptacles; and I do hereby declare the following to be a full, clear, and exact description of the invention, such as will enable others skilled in the art to which its appertains to make and use the same.

This invention relates to new and useful improvements in lid holders and one of its objects is the provision of a device of this character, which shall be simple, durable and efficient, and which may be manufactured and sold at a comparatively low cost.

A further object of this invention is to provide a device capable of being easily applied to any cooking receptacle or utensil, for the purpose of hingedly supporting a lid to the receptacle or utensil, and which may be easily and readily removed when desired to apply it to any other receptacle or utensil, and further may be removed from the lid for the purpose of applying it to another lid doing away with the necessity of having to have a lid holder for each lid.

A still further object of this invention is to provide a pair of substantially U-shaped members, adapted to be coiled around a horizontal rod to act as a hinge connection between the two members, and one of said members being detachably secured to the lid and the other member bent to form a clasp to receive the edges of a cooking utensil or receptacle and the last mentioned member being coiled around the horizontal rod at a point to provide an extension, which will support and provide a stop to the lid when swung to a vertical position.

With these and other objects in view as will become more apparent as the description proceeds, the invention consists in certain novel features and construction, combination and arrangement of parts as will be hereinafter more fully described and claimed.

For a complete understanding of my invention, reference is to be had to the following description and accompanying drawing, in which:—

Figure 1 is a fragmentary transverse sectional view of a cooking receptacle or utensil illustrating a lid holder applied thereto, constructed in accordance with my invention, and showing the lid swung to a substantially vertical position in dotted lines.

Fig. 2 is a top plan view of the lid holder illustrating it attached to a lid, and Fig. 3 is a perspective view of the lid holder removed from a receptacle and detached from a lid.

Referring in detail to the drawing, the numeral 1 indicates the side walls of a cooking receptacle or utensil of any desired formation, and the numeral 2 indicates a lid adapted to fit and close the receptacle, having a handle 3 secured to the center thereof, and provided with relatively spaced elongated slots to receive clips 4. The clips 4 are bent intermediate their ends to provide loops and the free ends passed through the slots and bent in opposite directions to engage the under face of the lid 2, to provide means of detachably securing the lid holder to the lid 2. The clips 4 may be applied in any other manner to lids of cooking utensils or receptacles by persons who simply press the lid holder separately by means of solder or any other well known securing means.

Referring specifically to the lid holder it consists of a horizontal rod 5 and a pair of substantially U-shaped members 6 and 7 constructed of wire or other suitable material. The web portion 8 of the U-shaped member is wound around the horizontal rod 5, as illustrated at 9 and 10, to provide a hinge connection between the U-shaped member 6 and the rod 5. The arms 11 of the U-shaped member 6 are inserted in the loop portions of the clips 4 and frictionally engage them to firmly attach the lid 2, to the U-shaped member 6.

The arms 12 of the U-shaped member 7 are wound around the rod 5 to provide a connection between the rod 5 and the U-shaped member 7, at a point adjacent the web 13 as illustrated at 14 and 15. The web 13 is disposed above and parallel to the hinge rod 5 and provides a stop for supporting the lid in a substantially vertical position as illustrated in Fig. 1. The arms 12 are bent back upon themselves and the free ends thereof bent downwardly to provide clasps 16 to receive the walls 1 of a cooking utensil or receptacle to detachably secure the U-shaped member 7 thereto.

From the foregoing description taken in connection with the accompanying drawing, it will be seen that a lid holder constructed in accordance with the foregoing description, is capable of being applied to any cooking utensil or receptacle, now upon the market by simply attaching the clips 4 in any suitable or well known manner to the cover to detachably receive the arms 11 of the U-shaped member 6 and the U-shaped member 7, then may be applied to the walls of the utensil or receptacle to provide a hinge to the cover, capable of supporting the cover in an open position to give free access to the utensil or receptacle when desired.

While I have shown and described the preferred embodiment of my invention, it will be understood that minor changes in construction, combination and arrangement of parts may be made without departing from the spirit and scope of the invention as claimed.

Having thus described my invention what I claim is:—

1. In combination, a receptacle including a lid having clips thereon, of a transverse rod, a substantially U-shaped member having its arm portions wound about the rod adjacent the web portion thereof to dispose the web portion in a plane above the rod for forming a support, said arm portions being bent upon themselves intermediate their ends and the free ends thereof bent downwardly in spaced relation to form hooks to receive the wall of the receptacle, and a substantially U-shaped member having its web portion wound about the rod between the arm portions of the first mentioned U-shaped member, the arm portions of the second mentioned U-shaped member being inserted in the clamp for securing them to the lid, and the web portion of the second mentioned U-shaped member forming a handle to swing the lid upwardly against the web portion of the first mentioned U-shaped member to support it thereupon.

2. A lid holder for receptacles comprising a hinged rod, a pair of U-shaped members having their arms coiled about said rod to form hinge connections and one of said members secured to a receptacle and the other member secured to a lid, the coiled portions of one of said members positioned on the rod outwardly of the coiled portions of the other member to prevent the latter from sliding off of said rod.

In testimony whereof I affix my signature in presence of two witnesses.

WILLIAM W. BROWN.

Witnesses:
J. W. WAKEFIELD,
ELLA N. CROSS.